United States Patent [19]

Stedman

[11] Patent Number: 5,000,382

[45] Date of Patent: Mar. 19, 1991

[54] PRESET TIMED CONTROL FOR HVAC OPERATION

[76] Inventor: Lowell F. Stedman, 12167 Country Green Blvd., Boynton Beach, Fla. 33437

[21] Appl. No.: 475,441

[22] Filed: Feb. 6, 1990

Related U.S. Application Data

[63] Continuation of Ser. No. 360,605, Jun. 2, 1989, abandoned.

[51] Int. Cl.⁵ .................................................. F23N 5/20
[52] U.S. Cl. ...................................... 236/46 R; 165/12
[58] Field of Search ............................ 236/46; 165/12

[56] References Cited

U.S. PATENT DOCUMENTS

| | | | |
|---|---|---|---|
| 3,785,165 | 1/1974 | Valenzuela, Jr. | 62/231 Y |
| 3,891,144 | 6/1975 | Sadler et al. | 236/47 |
| 3,917,165 | 11/1975 | Cross | 236/47 |
| 4,196,848 | 4/1980 | Falkenstein | 236/46 R |

*Primary Examiner*—William E. Wayner
*Attorney, Agent, or Firm*—Clifford A. Poff

[57] ABSTRACT

A control system for an existing central heating, cooling and ventilating unit (HVAC) in which a conventional plug-in timer and selector controller are employed to by-pass the normal control for the HVAC such that it can be made to operate for a predetermined amount of time regardless of temperature. Operation of the unit for a predetermined amount of time prevents mildew when a housing enclosure or the like is unoccupied without wasting electrical energy as would be the case when the HVAC is under normal control.

3 Claims, 2 Drawing Sheets

PRESET TIMED CONTROL FOR HVAC OPERATION

CROSS REFERENCE TO CO-PENDING APPLICATIONS

This application is a continuation of co-pending application Ser. No. 360,605 now abandoned filed Jun. 2, 1989.

1. Background of the Invention: In the usual air conditioning system, power is supplied to the cooling unit under the control of a thermostat in a servo system, the arrangement being such that when the temperature within the building being cooled rises above a certain level, power will be applied to the cooling unit to reduce the temperature back down to a certain desired level. As is known, the air conditioner also performs a dehumidifying function; and in certain climates, particularly those with high humidity, mildew within the housing or other building will occur if the air conditioner and consequent dehumidifying action is not effected periodically. In the southern United States, for example, it is recommended that the air conditioner be operated at least two hours per day to prevent mildew.

At the same time, if the housing unit or other building structure is not occupied for a period of time and if the air conditioning unit is controlled in a normal manner by a thermostat, the temperature will be maintained at a preset level, resulting in a waste of electrical energy since it is not necessary to cool the structure with no one occupying it.

In the past, systems such as those shown in U.S. Pat. No. 4,196,848, have been devised for overriding the thermostat and air conditioning system to effect energy reduction. However, the system shown in U.S. Pat. No. 4,196,848 does not specifically address the problem of humidity and mildew. Furthermore, it is a system designed to be an integral part of the air conditioning controls and requires installation by skilled personal.

SUMMARY OF THE INVENTION

The present invention resides in the provision of an inexpensive-preassembled unit for overriding thermostatic control of an air conditioning system in order to control humidity and mildew. It is easy to install and operate by unskilled personnel. It consists of a standard 120 volt clock timer which plugs into a standard 120 volt AC outlet, and a pre-set timed selector control consisting of a 120 volt AC plug-in relay and a single pole, double throw switch which is pre-wired in a standard enclosure for installation.

Operation of the invention is effected by setting the time tabs on the clock timer, switching the single pole, double throw switch to its timer position, and permitting the existing thermostat to perform its normal control, but only while the timer permits it to do so. Resetting the single pole, double throw switch to normal resumes normal operation, wherein the timer has no effect.

Most heating, ventilating and cooling units (HVAC) are equipped with a standard thermostat which is very easy to set. The addition to the pre-set control of the invention does not modify the existing thermostat, is easy to set, and can be switched to "normal" or "timed" modes by operation of a simple toggle switch.

The invention is particularly adapted for use in high humidity areas because it permits the air conditioner to operate for about two hours a day, in the early morning hours, while the living or working enclosure is closed for a vacation or extended absence. When the relative humidity is high and the temperature very warm, conditions exist for mildew to occur, resulting in a musty odor, and deterioration of cloth, wood, paper and the like.

Daily operation of the air conditioner in this manner will keep the air fresh and remove excessive humidity. By knowing the number of hours the air conditioning unit will run—which can not be predicted with a normal thermostatic control—operating costs will be kept at a minimum. The early morning time setting aids the power company load problem by causing the air conditioner to run during off-peak hours. This is very important, considering the great number of individuals in southern United States who migrate north during the hot, humid season and wish to protect their property while absent. Furthermore, when a housing unit is vacated during work or a vacation day, pre-setting the time of operation before leaving and return reduces the cost of running the unit all day.

BRIEF DESCRIPTION OF THE DRAWINGS

The above and other objects and features of the invention will become apparent from the following detailed description taken in connection with the accompanying drawings and in which.

DETAILED DESCRIPTION OF THE PREFERRED EMBODIMENTS

Figure 1:
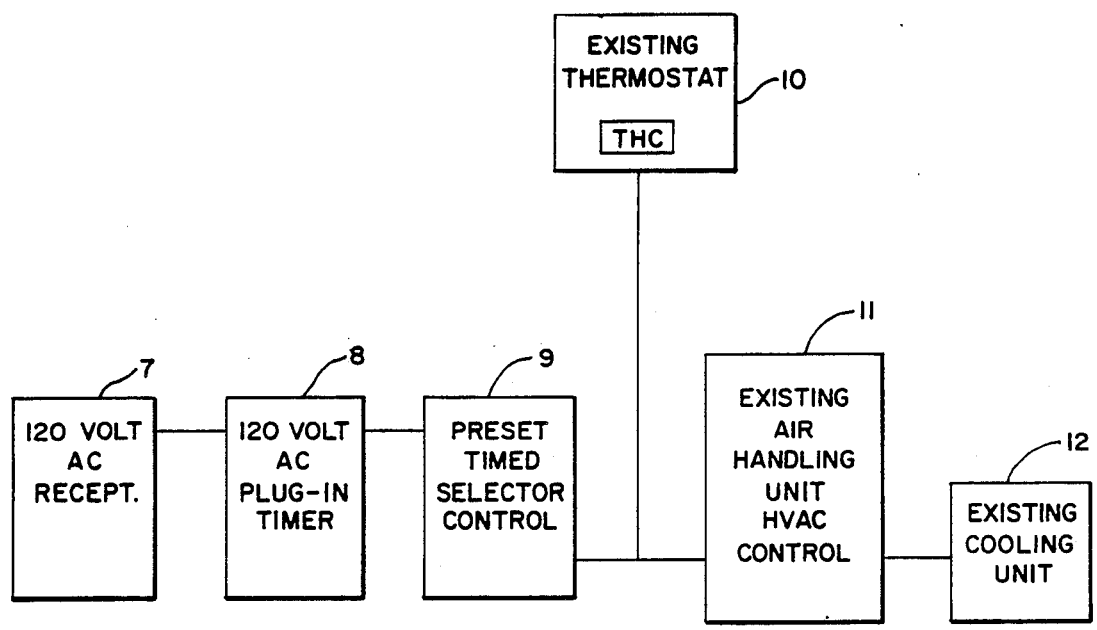
FIG. 1 is a block schematic diagram of the control system of the invention.

With reference now to the drawings, and particular to FIG. 1, 120 volt AC potential is provided at receptacle 7. This is applied through 120 volt plug-in timer 8 to the pre-set time-selector control 9 of the invention. 24 volt AC potential is applied to an existing air handling unit 11 through the preset time the selector control 9 and is also applied to an existing air conditioning thermostat 10. The existing thermostat 10 regulates the temperature, as is normal, in a switching arrangement, through the air handling unit 11 and the cooling unit 12 relay.

Figure 2:
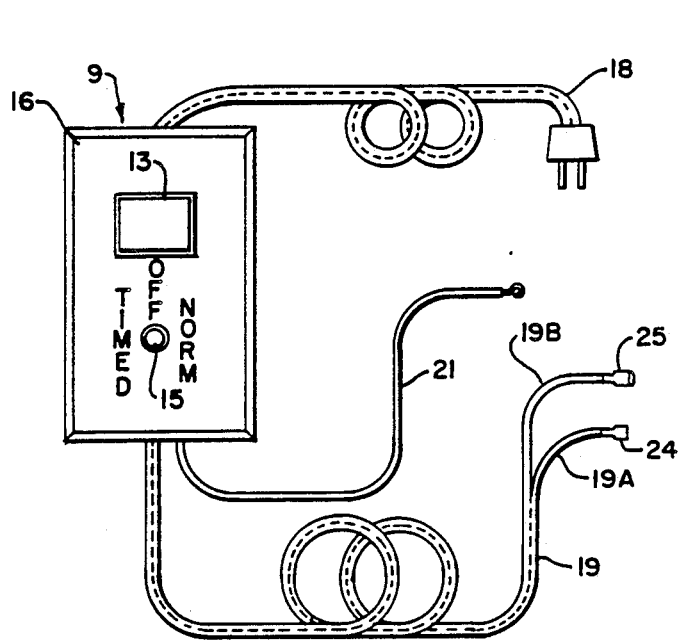
FIG. 2 is a front view of a pre-set timer control which may be utilized in the invention.
Figure 3:
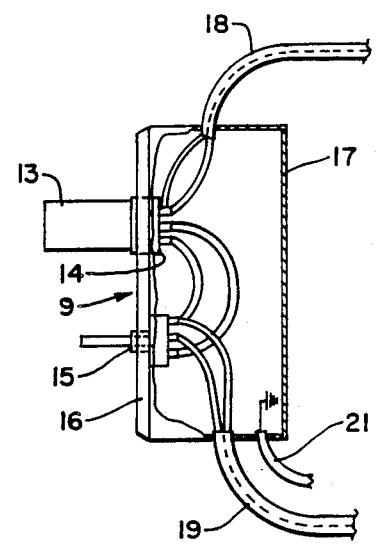
FIG. 3 is a cross-sectional side view of the pre-set timer control shown in FIG. 2.
Figure 4:
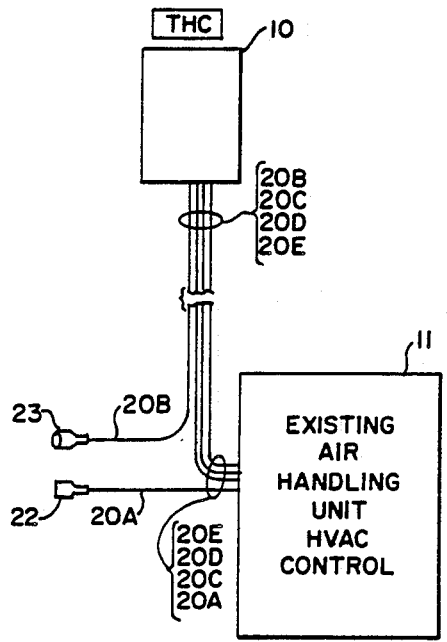
FIG. 4 is a schematic block diagram of a conventional thermostat and air conditioning unit adapted for connection to the system of the invention.
Figure 5:
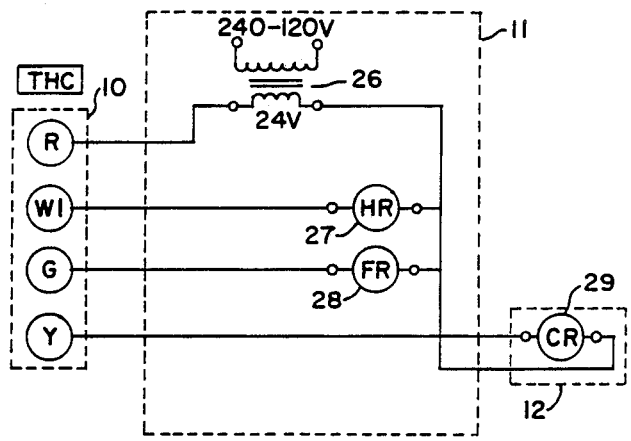
FIG. 5 is a schematic diagram of a typical HVAC control system.
Figure 6:
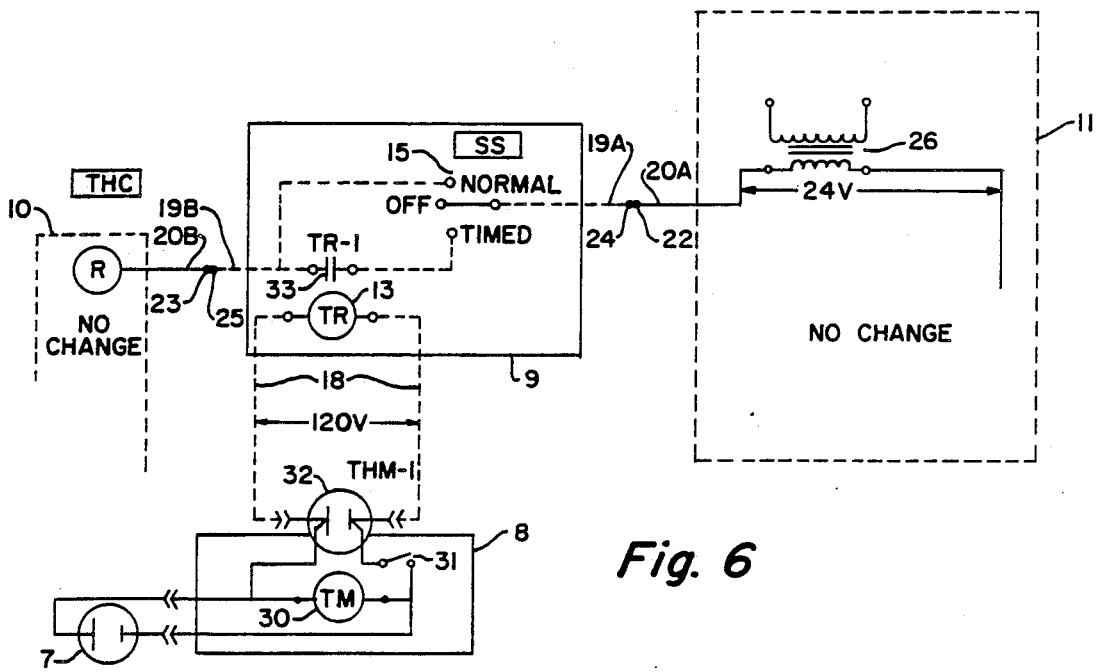
FIG. 6 is a schematic diagram of a standard HVAC control system incorporating the present invention.

FIGS. 2 and 3 show the plan and cross sectional views of the pre-set timed selector 9 completely wired and ready for installation; while FIG. 4 shows wires 20A, 20B, 20C, 20D, and 20E to the existing air handling unit HVAC control 11 and the existing thermostat 10. FIG. 5 is a typical schematic of a standard air conditioning control system; while FIG. 6 is a schematic diagram showing the system of FIG. 5 with the pre-set timed selector 9 of the present invention tied in series with the 24 volt control wire 28 and connected to the existing thermostat 10 via wire 20B.

In the drawings, the elements which have not already been described comprise the existing air conditioning cooling unit 12 (FIGS. 1 and 5). Element 13 is a single pole No. 120 volt plug-in relay glass enclosed (FIGS. 2 and 3); and element 13 is a 10A plug-in relay base. Element 15 as shown in FIGS. 2, 3 and 6 is a 10A SPDT toggle switch; while element 16 is a mounting plate for relay base 14 and toggle switch 15. Element 17 in FIG. 3 is an enclosure for the wiring for the preset time selector control 9. Elements 18 and 19 comprise cords for 120 volt potential and 24 volt potential, respectively (FIGS. 2 and 3). Elements 19A and 19B are comprised of one conductor each of the cord 15 to apply the 24 volt potential from element 20A or 9, respectively. Element 21 shown in FIGS. 2 and 3 comprises a ground wire; while elements 22-25 comprise insulated quick disconnect wire connectors, either male or female. Element 26 is the existing 24 volt control transformer in the ordinary air conditioning system; element 27 is an existing heat relay; element 29 is an existing cooling relay; element 30 is a plug-in timer clock; element 31 is a plug-in timer time switch; element 32 is a plug-in timer timed receptacle; and element 33 is a normally open contact on relay 13.

With specific reference to FIGS. 2-6, the plug-in timer 8 is plugged into any conventional AC power outlet 7 which energizes its timer motor 30. Timer motor 30 will close its time switch 31 at a desired pre-set time to energize its timed receptacle 32. The pre-set timed control 9 is plugged into the timed receptacle 32 by cable 18 which connects the plug-in relay 13 to an external 120 volt AC potential. This closes relay contact 33; and with the selector switch 15 in timed position, 24 volt potential is supplied to the existing thermostat 9 by wires 20A, 20B, 19A and, 19B. The air handling unit 11 will operate as determined by the setting of thermostat 9 until the pre-set time expires. It will then shut-down with the 120 volt AC source removed from relay 13 by the timer timed switch 31. Timer 8 controls this pre-set time cycle daily until it is reset manually by selector switch 15. To revert to normal operation, selector switch 15 is switched to normal position and the HVAC unit 11 is then controlled by the existing thermostat 10. Selector switch 15 can be used to shut-down the system by switching to the off position. The plug-in timer A in the schematic can be either a single set timed device or a multiple set timed device, depending upon requirements.

Reverting again to FIGS. 2 and 4, quick disconnect, insulated wire connectors are provided. Connector 22 is a male connector and connector 23 female. These connect to connectors 24 and 25 as shown in FIG. 2. If the control 9 of the present invention is removed from the circuit, the control system reverts to the schematic of FIG. 5 by plugging quick disconnect wire connectors 22 and 23 (FIG. 4) together. Element 21 in FIG. 2 is a ground wire. Thus, by simply plugging in the plug 18 to a conventional 120 volt AC outlet, and by connecting connectors 24 and 25 to connectors 22 and 23, respectively, the system is ready for operation. When switch 15 is in its normal or off position, control is via conventional thermostat 10; however when switch 15 is in its closed or timed position, the pre-set timed selector control 9 takes over under the control of plug-in timer 8.

Although the invention has been shown in connection with a certain specific embodiment, it will be readily apparent to those skilled in the art that various changes in form and arrangement of parts can be made to suit requirements without departing from the spirit and scope of the invention.

What is claimed is:

1. A control system for an existing central heating, ventilating and cooling until (HVAC), said system comprising a selector controller and a conventional plug in timer, the controller adapted to be connected in electrical series between an existing HVAC thermostat and an existing low voltage control circuit for actuating conventional devices in the HVAC, said controller comprising a relay, a relay operated switch connected in circuit with a three position manual switch, said manual switch having a first off position, a second timed position in which the manual switch is series connected with said relay switch and a third normal position by-passing said relay switch, said plug in timer having a timer operated switch and said timer being connected to said relay by an external cord plugged into the timer, said timer adapted for plugging into a standard wall outlet, said system operating such that when the manual switch is in the timed position the thermostat operates the HVAC only when the timer operated relay switch is closed and when in the normal position the thermostat controls the HVAC.

2. The system of claim 1 in which the controller is mounted as a permanent installation between the thermostat and the low voltage control circuit.

3. The system of claim 1 in which the controller is adapted for portability and temporarily connected to the thermostat and the low voltage control circuit.

* * * * *